United States Patent

Humbert

[15] 3,686,768
[45] Aug. 29, 1972

[54] TWO-PLANE BORE LEVELING DEVICE

[72] Inventor: Marvin H. Humbert, Cedar Rapids, Iowa

[73] Assignee: Cedar Rapids Engineering Company, Cedar Rapids, Iowa

[22] Filed: June 30, 1971

[21] Appl. No.: 158,192

[52] U.S. Cl. ............. 33/185 R, 33/181 AT, 33/207 R
[51] Int. Cl. .............................................. B27g 23/00
[58] Field of Search ...... 33/180 AT, 181 AT, 185 R, 33/185 V, 207 R, 89, 112

[56] References Cited

UNITED STATES PATENTS

| | | | |
|---|---|---|---|
| 613,946 | 11/1898 | Starrett | 33/89 |
| 1,423,309 | 7/1922 | Curtis | 33/211 X |
| 2,326,562 | 8/1943 | Rensen | 33/112 |

Primary Examiner—Leonard Forman
Assistant Examiner—Charles E. Phillips
Attorney—Carlton Hill et al.

[57] ABSTRACT

A two-plane bore leveling device for use in aligning bores in various structures, such as valve guides in automotive engines during reconditioning and/or salvage operations. The leveling device comprises a try square having a horizontal leg and a vertical leg. Two spirit level vials are positioned within the horizontal leg for top and side viewing. The vertical leg is provided with an interiorly hollow sleeve portion for receiving a shaft fitting within the bore to be aligned. Leveling is accomplished by inserting an appropriate shaft within the bore, sliding the sleeve portion of the leveling device onto the shaft and tilting the bore-containing structure to level in one plane. The horizontal leg of the leveling device is then rotated 90° on the shaft and the bore-containing structure is tilted to level in the other plane.

5 Claims, 3 Drawing Figures

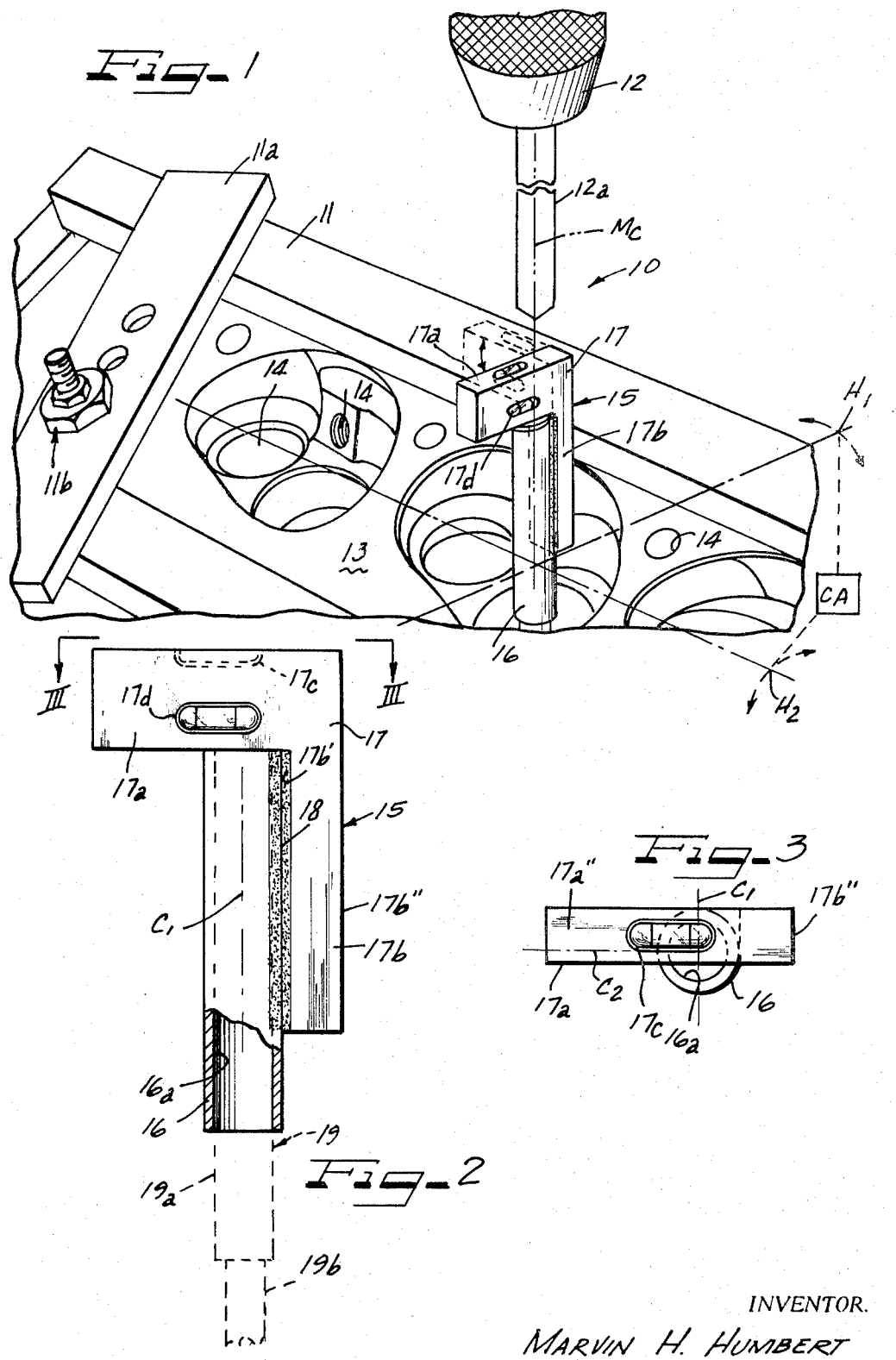

TWO-PLANE BORE LEVELING DEVICE

BACKGROUND OF THE INVENTION

1. Field of the Invention

The invention relates to bore aligning devices and more particularly to bore leveling devices for precisely orientating a particular workpiece centerline with a machine spindle centerline.

2. Prior Art

Reconditioning of bore-containing structures, such as automotive engines, requires precise alignment of various bores therein, such as valve guides, etc. in order to provide satisfactorily operating reconditioned structures. Bores lose their precise alignment since bore wall portions become non-parallel through use and during reconditioning require reboring to achieve parallel walls. Worn bores generally are tapered having enlarged upper openings so that precise alignment of a cutting tool along a true centerline is extremely difficult and/or cumbersome. Techniques presently employed are unreliable and have failed to readily and economically provide the desiring leveling characteristics.

SUMMARY OF THE INVENTION

The invention provides a two-plane horizontal or vertical bore leveling device for precisely orientating a particular workpiece centerline with a machine spindle centerline and comprises a two-legged try square having spirit level means associated with one leg and an open ended hollow sleeve associated with the other leg. In a preferred embodiment, the leveling device comprises of two pieces joined together into a unitary assembly. A right angle try square is joined to a cylindrical sleeve so that the centerlines of the cylinder are respectively substantially parallel to the outer longitudinal face surfaces of each of the legs.

BRIEF DESCRIPTION OF THE DRAWINGS

FIG. 1 is an elevated prospective partial view of the invention in an operational environment;

FIG. 2 is a side elevated side view illustrating a preferred embodiment of the invention; and FIG. 3 is a view taken substantially along lines III—III of FIG. 2.

DESCRIPTION OF THE PREFERRED EMBODIMENTS

As illustrated at FIG. 1, an operational environment 10 for the invention includes a workpiece 13, such as an automotive cylinder head or the like, supported in a cradle means 11 having a tie-down means 11a, which is here shown as a bolt and nut combination 11b, securing the workpiece 13 to the cradle means 11. A machine spindle means 12 is operationally associated with the cradle means 11 and is selectively positionable therealong.

The cradle means 11 is provided with an adjustment means CA allowing selective tilting of the workpiece 13 along right angle horizontal planes, substantially as indicated by the curved double-headed arrows $H_1$ and $H_2$. The adjustment means CA includes tunnion mounting means, tilting tables, air floating devices, etc. and is generally characterized as a means of allowing select movement of the cradle means along horizontal right angle planes for leveling a workpiece within the cradle means.

The machine spindle means 12 is provided with a cutting tool 12a suitable for a desired reboring or the like operation. The machine spindle means 12 has a vertical centerline Mc that is alignable to be perpendicular to an up-facing portion of the workpiece 13. The workpiece 13 has a plurality of bores 14 of various size diameters. Bores 14 are originally placed in the workpiece 13 at various angles, including conventional and compound angles (designated as bore centerlines) and each bore 14 must be precisely horizontally or vertically aligned for proper reboring operations. Angular adjustment of the cradle means 11 allows the workpiece 13 to be adjusted so that the centerline of a particular bore 14 is vertically aligned (i.e., parallel) with the machine spindle means centerline Mc. The spindle means 12 is then moved into registry with a bore 14 and the cutting tool 12a is energized so as to engage the workpiece 13 and particularly the peripheral walls of the bore 14 and rebore such walls parallel with the spindle means centerline.

A bore centerline alignment is accomplished by the two-plane bore leveling device 15 of the invention. The leveling device 15 comprises a two-legged try square unit 17 having an upper horizontal leg 17a and a lower vertical leg 17b. The upper leg 17a is provided with a spirit level means, such as a topview spirit level vial 17c and a sideview spirit level vial 17d. While the spirit level vials 17c and 17d are shown as being aligned one above the other, other arrangements are also useful. The vials 17c and 17d are of conventional construction and are mounted within the leg 17a in a conventional manner. In fact, a conventional machinist's level can be adapted for use in the leveling device of the invention. A cylindrical sleeve 16 having a hollow interior 16a of a given diameter is integrally associated, as by adhesive bond, welding or other means, with the interior side face 17b' of the lower leg 17b. The sleeve 16 and the leg 17b are preferably adhesively bonded, as along common area 18, to form a unitary assembly capable of withstanding the normal abuse of a machine shop environment. A centerline $C_1$ (best seen at FIG. 3) of the cylinder sleeve 16 is precisely aligned so as to be substantially parallel with the surface of the outer end face 17b''. A centerline $C_2$ of the sleeve member is precisely aligned so as to be substantially parallel to the surface of the upper top face 17a''. In other words, the centerlines $C_1$ and $C_2$ of the sleeve 16 are aligned so as to be substantially parallel with the outer longitudinal face surfaces 17a'' and 17b'' of the legs 17a and 17b. Actually the true centerline of the sleeve member 16 is the longitudinal axial line extending through the point of intersection of lines $C_1$ and $C_2$ and this centerline is aligned so as to be substantially parallel with the outer longitudinal face surface of the vertical leg and substantially perpendicular with the outer longitudinal face surface of the horizontal leg. In this manner, a precisely square instrument is attained. While the preferred embodiment of the invention comprises two pieces joined together into a rigid unitary assembly, other embodiments include a single piece construction having a suitable end bore in leg 17b, an assembly having relative movement between the sleeve 16 and the try square unit 17 as well as other associations of the two pieces are included within the invention.

A suitable shaft 19, as best seen at FIG. 2, having a standard diameter upper portion 19a, and a select diameter (which is different from shaft to shaft) lower portion 19b is provided for insertion into a bore 14. The diameter of the lower portion 19b is selected to snugly fit within an original diameter of a given bore and thus snugly engage the non-worn wall portions of such a bore. The standard diameter of the upper portion 19a is chosen to snugly fit within the interior 16a of the sleeve member 16. A plurality of such shafts are provided for combination with the leveling device 15. In the embodiment illustrated, the shaft 19 occupies the entire length of the sleeve 16, however, in other embodiments appropriate stop means, such as pins or the like are associated with the sleeve member 16 (although they could be associated with the shaft 19) and function to limit the penetration of the shaft 19 into the sleeve 16.

An appropriate size shaft is selected and inserted into a bore, then the leveling device 15 is positioned thereon, as shown in solid line at FIG. 1. The adjustment means CA is then selectively actuated allowing the workpiece 13 to be tilted, as in the direction of arrow $H_2$ and be leveled in one plane. Thereafter the device 15 is rotated in 90°, as by manual operation, to a horizontally perpendicular position, as shown in dotted line at FIG. 1, and the adjustment means CA is again selectively actuated allowing the workpiece to be tilted, as in the direction of arrow $H_1$ and be leveled in the other plane. The machine spindle means 12 is positioned in plumb with the cradle means 11. The spindle means 12 is brought into alignment with a shaft 19 properly positioned in a bore in a manner described. The centerline of the spindle means 12 and of the bore 14 (as indicated by the shaft 19) are aligned so as to be at least parallel with each other. The spindle means 12 is then brought into registry with the bore, the leveling device 15 and shaft 19 removed, and the appropriate reboring operations begun.

The specific embodiments here described are only illustrative of the invention. Other embodiments including positioning an additional spirit level along the vertical leg of the try square, so as to facilitate vertical alignments, also are encompassed by the invention. Various other changes in structure may additionally occur to those skilled in the art; and all of these changes are to be understood as forming a part of the invention insofar as they fall within the true spirit and scope of the appendant claims.

I claim as my invention:

1. A two-plane bore leveling device for use in aligning bores, comprising in combination, a shaft having an upper portion of a given diameter and a lower portion of a diameter corresponding to an original diameter of the bore being aligned, a rigid unitary assembly comprised of a horizontal leg and a vertical leg, each leg having an outer longitudinal face surface parallel with an inner longitudinal face surface, said legs being joined to one another so that their respective longitudinal outer face surfaces are substantially perpendicular to each other, a spirit level means mounted for view within said horizontal leg for indicating alignment of said horizontal leg in horizontal planes, and a hollow sleeve member mounted on the inner longitudinal face surface of said vertical leg so as to have a centerline substantially parallel with the outer longitudinal face surface of the vertical leg and substantially perpendicular with the outer longitudinal face surface of the horizontal leg, said sleeve member having an inner diameter of a size snugly receiving said shaft upper portion.

2. A two-plane bore leveling device as defined in claim 1 wherein the sleeve member is adhesively bonded to the vertical leg.

3. A two-plane leveling instrument for use in aligning a work piece center line with a machine spindle centerline comprising, a unitary assembly having a horizontal leg and a vertical leg joined to one another, each leg having an outer longitudinal face surface parallel to an inner longitudinal face surface, said legs being joined to one another so that their respective longitudinal outer face surfaces are substantially perpendicular to each other, a spirit level means mounted for view within said horizontal leg for indicating alignment of said instrument in a horizontal plane, and a hollow sleeve member having a given inner diameter for mounting onto a workpiece, said sleeve member being mounted on the inner longitudinal face surface of said vertical leg so as to have a center line substantially parallel with the outer longitudinal face surface of said vertical leg and substantially perpendicular with the outer longitudinal face surface of the horizontal leg.

4. A two-plane leveling instrument as defined in claim 3 including a shaft having an upper portion with an outer diameter snugly fitting within the sleeve member and a lower portion of a diameter corresponding to an original diameter of a bore in a workpiece.

5. A two-plane bore leveling instrument as defined in claim 3 wherein the spirit level means comprises of at least two spirit level vials mounted in the horizontal leg for side and top viewing.

* * * * *